(12) United States Patent
Kawamoto (10) Patent No.: US 10,811,875 B2
(45) Date of Patent: Oct. 20, 2020

(54) POWER SUPPLY APPARATUS

(71) Applicant: CANON KABUSHIKI KAISHA, Tokyo (JP)

(72) Inventor: Tomohiro Kawamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 16/184,124

(22) Filed: Nov. 8, 2018

(65) Prior Publication Data

US 2019/0148937 A1    May 16, 2019

(30) Foreign Application Priority Data

Nov. 15, 2017 (JP) ................. 2017-220127

(51) Int. Cl.
*H02J 1/10* (2006.01)
*H04L 12/10* (2006.01)

(52) U.S. Cl.
CPC ............... *H02J 1/10* (2013.01); *H04L 12/10* (2013.01)

(58) Field of Classification Search
CPC ............... H02J 1/10; H02L 2/10; H04L 12/10
USPC ............................. 307/80, 82, 64
See application file for complete search history.

(56) References Cited

U.S. PATENT DOCUMENTS

| 2008/0168283 A1* | 7/2008 | Penning | G06F 1/263 713/310 |
| 2011/0096522 A1* | 4/2011 | Humphrey | H05K 7/1498 361/807 |
| 2011/0125341 A1* | 5/2011 | Heath | H02J 1/108 700/295 |
| 2013/0191655 A1* | 7/2013 | Schlichter | H04L 12/10 713/300 |

FOREIGN PATENT DOCUMENTS

JP     2015-192506 A    11/2015

* cited by examiner

*Primary Examiner* — Michael R. Fin
(74) *Attorney, Agent, or Firm* — Venable LLP (57) ABSTRACT

A power supply apparatus receives power from a first power source and a second power source, and provides power to a load section. The apparatus comprises: a first supply unit configured to supply power of a first converted voltage; a second supply unit configured to supply power of a second voltage; a third supply unit configured to supply power of a second converted voltage; and a control unit configured to control power supply to the load section by one of the first supply unit, the second supply unit, and the third supply unit, based on a power receiving state of power from the first power source and the second power source. The control unit controls to supply power to the load section by the third supply unit for a predetermined period after the first power source is connected.

9 Claims, 7 Drawing Sheets

FIG. 2

| PATTERN | POWER SOURCE (PSE) | POWER SOURCE (GENERAL-PURPOSE POWER SOURCE) | FET107 OPERATION STATE |
|---|---|---|---|
| 1 | CONNECTED | CONNECTED | OFF |
| 2 | CONNECTED | UNCONNECTED | OFF |
| 3 | UNCONNECTED | CONNECTED | ON |

| PATTERN | STATE OF CONNECTION | |
| --- | --- | --- |
| | POWER SOURCE (PSE) | POWER SOURCE (GENERAL-PURPOSE POWER SOURCE) |
| 1 | CONNECTED | CONNECTED |
| 2 | CONNECTED | UNCONNECTED |
| 3 | UNCONNECTED | CONNECTED |

POWER SUPPLY APPARATUS

BACKGROUND OF THE INVENTION

Field of the Invention

The present invention relates to a power supply apparatus that switches a power supply source for use.

Description of the Related Art

In recent years, there has been known a technique of supplying data and power by using an Ethernet® cable. For example, a technique complying with the IEEE802.3at standard is called PoE (Power Over Ethernet®). In PoE, power is supplied from a power supply apparatus (PSE: Power Sourcing Equipment) to a power receiving apparatus (PD: Powered Device). In PoE, in order to prevent an overcurrent from flowing to a cable, the PSE has a function of stopping power supply to the PD upon consumption of a predetermined current or more. In addition, when the PD is connected, the PSE executes a negotiation sequence complying with the standard and then starts power supply to the PD. The PSE has a function of stopping power supply until the negotiation sequence terminates in order to prevent an overcurrent from flowing.

This causes an operation problem upon switching the power source in, for example, a power receiving apparatus (e.g., a monitoring camera) that can switch between a general-purpose power source (such as an AC adapter) and a PoE power source (PSE) to receive power. For example, when switching from the AC adaptor to the PSE, since power will not be supplied until the negotiation sequence terminates, the operation stops.

Japanese Patent Laid-Open No. 2015-192506 (patent literature 1) discloses a technique of preventing stop of power supply by allowing switching from an AC adaptor to a PoE compatible power source when a predetermined period has passed after the voltage of the PoE compatible power source has reached a predetermined voltage.

However, in the technique disclosed in the above-described patent literature 1, power efficiency in power reception degrades because of having a boosting circuit in a power supply path from a general-purpose power source. In addition, since heat generated from the circuit increases, extra cost is required for the countermeasure against heat.

SUMMARY OF THE INVENTION

According to one aspect of the present invention, a power supply apparatus that is configured to be capable of receiving power from a first power source and a second power source, and provides power to a load section, the apparatus comprises: a first supply unit configured to supply power of a first converted voltage obtained by converting a first voltage from the first power source; a second supply unit configured to supply power of a second voltage from the second power source; a third supply unit configured to supply power of a second converted voltage obtained by converting the second voltage from the second power source; and a control unit configured to control power supply to the load section by one of the first supply unit, the second supply unit, and the third supply unit, based on a power receiving state of power from the first power source and the second power source, wherein the control unit controls to supply power to the load section by the third supply unit for a predetermined period after the first power source is connected.

The present invention provides a power supply apparatus that enables stable power supply to a load section while improving power efficiency in power reception.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described below in detail with reference to the accompanying drawings. Note that the following embodiments are merely examples and are not limit the scope of the present invention.

First Embodiment

A power receiving apparatus 103 that receives power from a PSE and a general-purpose power source will be exemplified as the first embodiment of a power supply apparatus according to the present invention.

<Arrangement of Apparatus>

Figure 1:
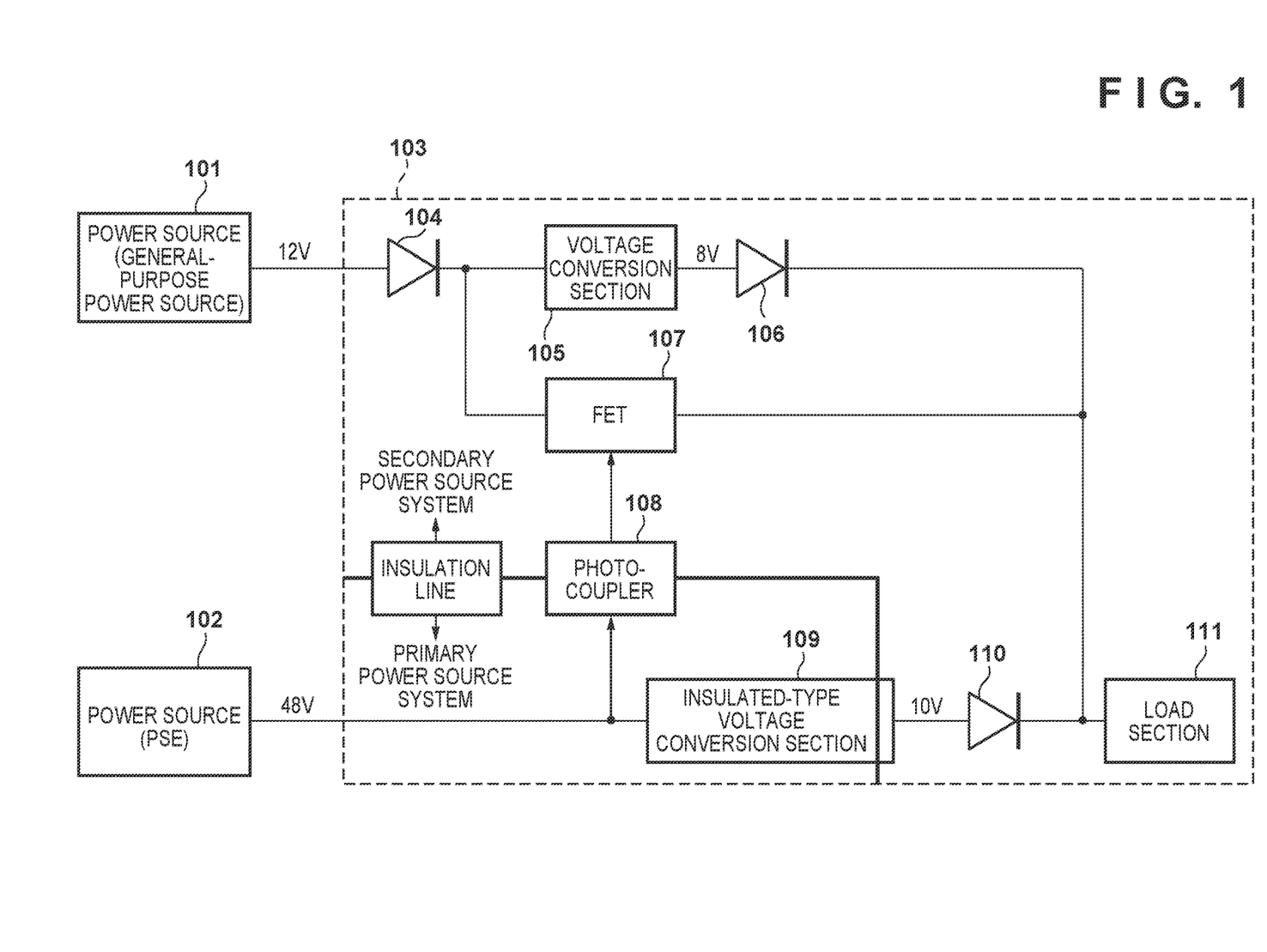
FIG. 1 is a block diagram showing the internal arrangement of a power receiving apparatus according to the first embodiment.

FIG. 1 is a block diagram showing the internal arrangement of the power receiving apparatus 103 according to the first embodiment. A power source 102 is a power supply apparatus (i.e., PSE) which supplies power in accordance with the PoE standard. On the other hand, a power source 101 is a general-purpose power supply apparatus represented by an AC adapter or the like. The power receiving apparatus 103 is an electronic equipment represented by a camera or the like.

In the power receiving apparatus 103, a secondary power source system including the power source 101 and a primary power source system including the power source 102 are arranged to be insulated from each other. The power receiving apparatus 103 is configured to provide power to a load section 111 including an image sensor and image processing IC by switching between power supplied from the power source 101 and power supplied from the power source 102.

Therefore, the power receiving apparatus 103 comprises a voltage conversion section 105 which converts the voltage of the power source 101 in the secondary power source system. More specifically, a backflow prevention diode 104 is located between the power source 101 and the voltage conversion section 105, and a backflow prevention diode 106 is located between the voltage conversion section 105 and the load section 111. In addition, an FET 107 as a switch function is located between the diode 104 and the load section 111. The power receiving apparatus 103 comprises an insulated-type voltage conversion section 109 which converts the voltage of the power source 102 in the primary power source system.

A backflow prevention diode 110 is located between the insulated-type voltage conversion section 109 and the load section 111. Furthermore, a photocoupler 108 is located between the power source 102 and the FET 107. The photocoupler 108 transmits, from the primary power source system to the secondary power source system, that the power source 102 is connected. That is, the photocoupler 108 has a function of a detection unit for detecting that the power source 102 is connected.

Note that in the description below, it is assumed that the output voltage of the power source 102 is 48 V, and the output voltage of the power source 101 is 12 V. It is also assumed that the output voltage of the voltage conversion section 105 is 8 V, and the output voltage of the insulated-type voltage conversion section 109 is 10 V.

<Operation of Apparatus>

There are following three patterns of the states of connection with (states of receiving power from) the two power sources when the power receiving apparatus operates (a pattern in which the power receiving apparatus is connected to neither of the power sources is not considered because power supply to the load section is impossible in this case). Note that "connection" here means a state in which power supply is available.

Pattern 1: a case in which both of the power sources 101 and 102 are connected

Pattern 2: a case in which the power source 102 alone is connected

Pattern 3: a case in which the power source 101 alone is connected

Figure 2:
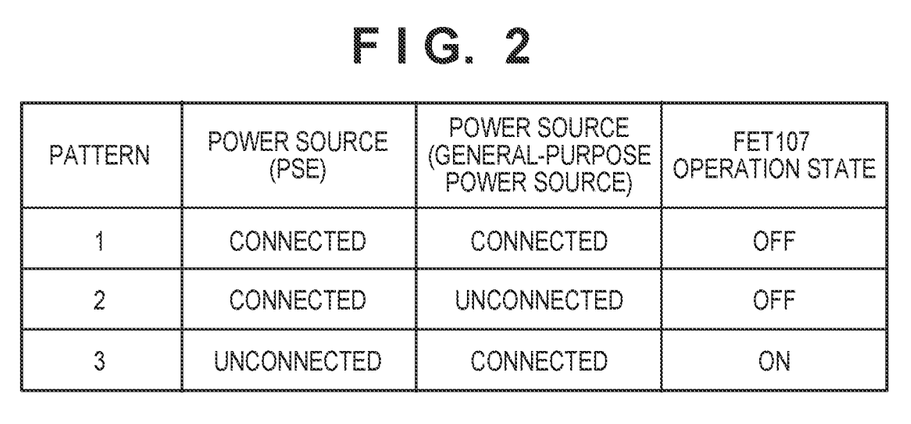
FIG. 2 is a table showing the operation state of an FET which corresponds to the state of connection with two power sources.
Figure 6:
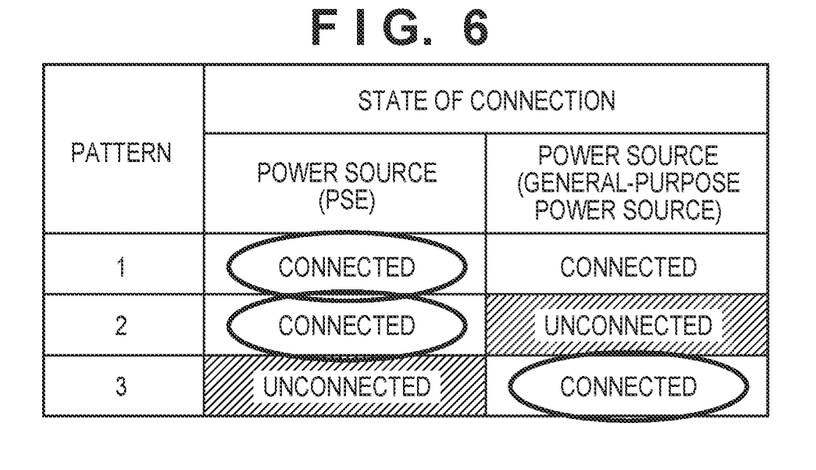
FIG. 6 is a table showing the power source that supplies power to a load section in each state of connection with the two power sources.

FIG. 2 is a table showing the operation state of the FET 107 which corresponds to the state of connection with the two power sources. The operation state is "OFF" in Pattern 1, "OFF" in Pattern 2, and "ON" in Pattern 3. Although the details thereof will be described later, the FET 107 is in charge of control of switching between power supply from the diode 104 to the load section 111 and power supply from the diode 106 to the load section 111. FIG. 6 is a table showing the power source that supplies power to the load section 111 in practice in each state of connection with the two power sources.

It is apparent that the power source 102 supplies power to the load section 111 in Pattern 2, and the power source 101 supplies power to the load section 111 in Pattern 3. In order to explicitly indicate this, the power source 102 is encircled for Pattern 2 and the power source 101 is encircled for Pattern 3 in FIG. 6. Power is supplied from the power source 102 to the load section 111 in Pattern 1. In order to explicitly indicate this, the power source 102 is encircled in FIG. 6.

In the above-described three patterns, how the voltage supply path to the load section 111 changes when power supply changes will be described below. More specifically, four state changes, that is, a state change from Pattern 1 to Pattern 2, a state change from Pattern 1 to Pattern 3, a state change from Pattern 3 to Pattern 1, and a state change from Pattern 2 to Pattern 1 will be described.

<1. Operation when Changing Pattern 1 to Pattern 2>

Figure 3:
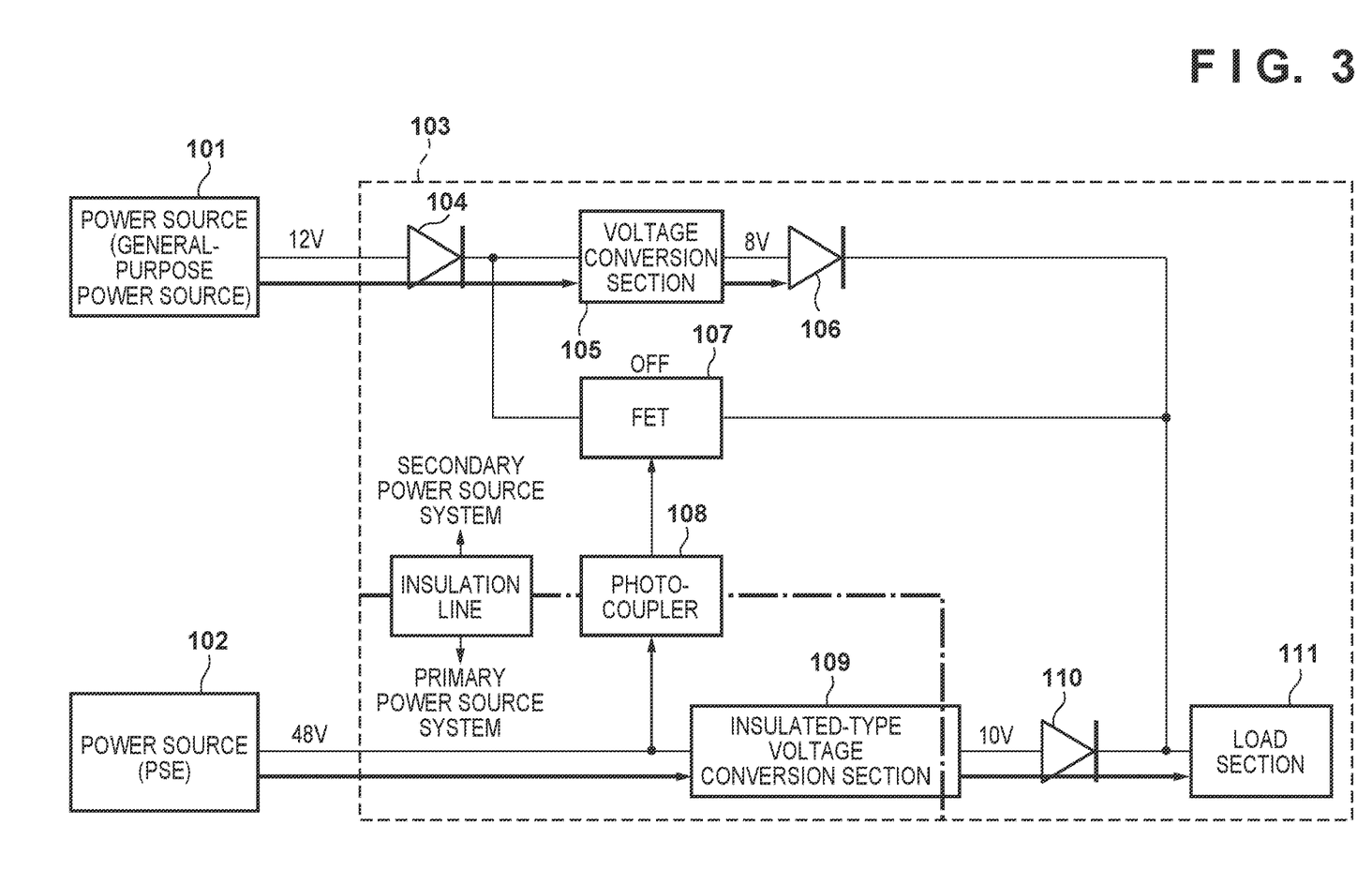
FIG. 3 is a view exemplarily showing the state of power supply when both of the two power sources are connected.

FIG. 3 is a view exemplarily showing the state of power supply when both of the two power sources are connected. That is, FIG. 3 shows a voltage supply state in Pattern 1 shown in FIG. 6. Since both of the power source 101 and the power source 102 are connected, the FET 107 is "OFF" as described with reference to FIG. 2.

A voltage of 12 V supplied from the power source 101 is converted to 8 V by the voltage conversion section 105. On the other hand, a voltage of 48 V supplied from the power source 102 is converted to 10 V by the insulated-type voltage conversion section 109.

An output from the voltage conversion section 105 and an output from the insulated-type voltage conversion section 109 are combined at a diode-OR connection by the diode 106 and the diode 110. This diode-OR connection is in charge of a function of switching between the output from the voltage conversion section 105 and the output from the insulated-type voltage conversion section 109. More specifically, power is supplied to the load section 111 from the diode 110 side having a higher voltage.

When the power source 101 is disconnected in the state shown in FIG. 3, that is, when changing Pattern 1 to Pattern 2 shown in FIG. 6, switching of power source does not occur. That is, the power source to supply power to the load section 111 remains to be the power source 102. Hence, stop of power supply to the load section 111 does not originally occur.

<2. Operation When Changing Pattern 1 to Pattern 3>

When the power source 102 is disconnected in the state shown in FIG. 3, that is, when changing Pattern 1 to Pattern 3 shown in FIG. 6, switching of power source occurs. That is, the power source to supply power to the load section 111 changes from the power source 102 to the power source 101.

Figure 7:
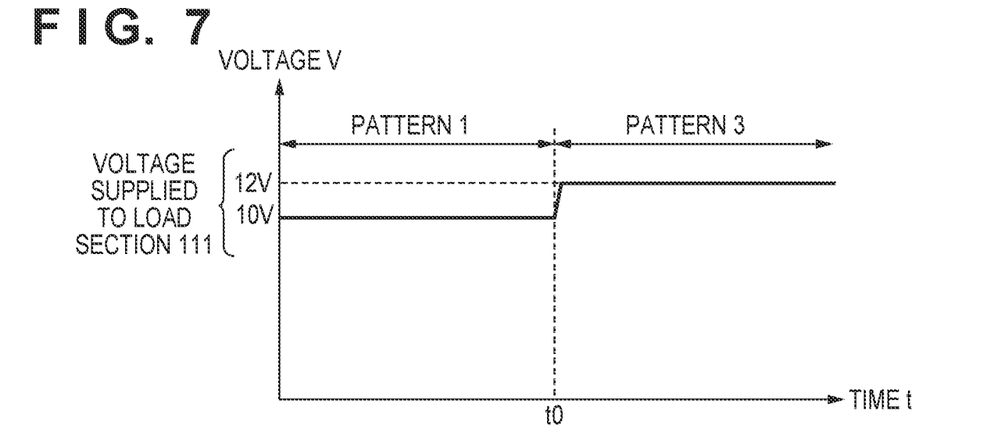
FIG. 7 is a view exemplarily showing a voltage supplied to the load section when switching power supply by the power source 102 to power supply by the power source 101.

FIG. 7 is a view exemplarily showing voltage supplied to the load section 111 when switching power supply by the power source 102 to power supply by the power source 101. A horizontal axis indicates time t and a vertical axis indicates voltage V. A case in which switching of power source has occurred at t=t0 is shown.

That is, it is shown that switching from a state in which power is supplied from the power source 102 to a state in which power is supplied from the power source 101 has occurred at t=t0. Hence, in accordance with FIG. 2, the FET 107 changes from the "OFF" state to the "ON" state at t=t0.

Before switching of power source occurs (i.e., when t<t0), the state of connection is Pattern 1 shown in FIG. 6. Hence, as described above, the load section 111 is supplied with power from the power source 102, and its voltage value is 10 V.

After switching of power source has occurred (i.e., when t>t0), the state of connection is Pattern 3 shown in FIG. 6. Hence, as described above, the load section 111 is supplied with power from the power source 101, and its voltage value is 12 V.

In this way, when changing Pattern 1 to Pattern 3, a negotiation sequence between the power source and the power receiving apparatus 103 does not occur. Hence, it is possible to switch the power source without stopping power supply to the load section 111.

<3. Operation When Changing Pattern 3 to Pattern 1>

Figure 4:
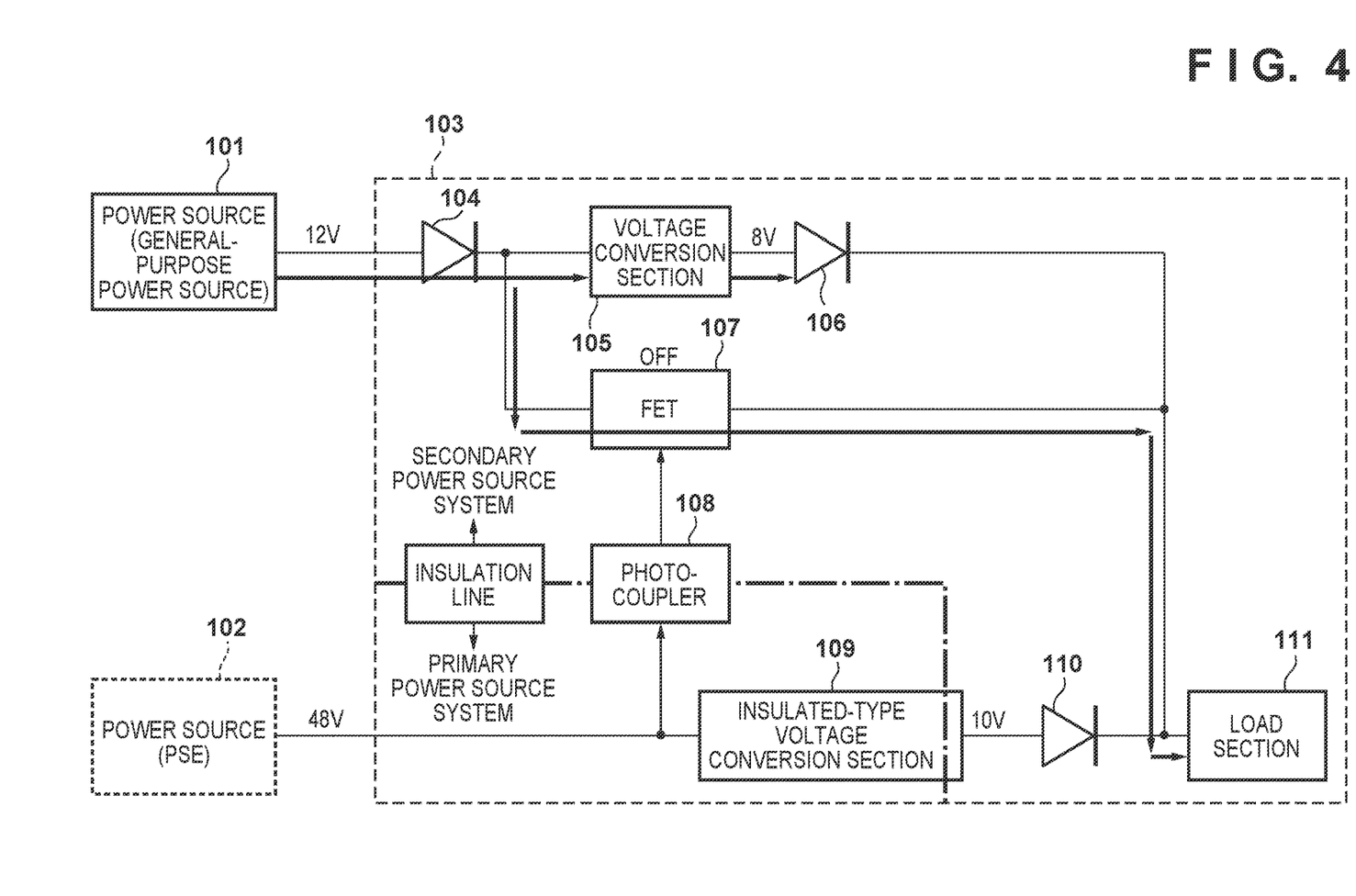
FIG. 4 is a view exemplarily showing the state of power supply when a power source 101 alone is connected.

FIG. 4 is a view exemplarily showing the state of power supply when a power source 101 alone is connected. That is, FIG. 4 shows a voltage supply state in Pattern 3 shown in FIG. 6. Since the power source 101 alone is connected, the FET 107 is "ON" as described with reference to FIG. 2.

A voltage of 12 V supplied from the power source 101 is converted to 8 V by the voltage conversion section 105. An output from the voltage conversion section 105 and an output from the power source 101 are combined at a diode-OR connection by the diode 104 and the diode 106. This diode-OR connection is in charge of a function of switching between the output from the voltage conversion section 105 and the output from the power source 101. More specifically, power is supplied to the load section 111 from the diode 104 side having a higher voltage.

That is, in the arrangement (FIG. 1) of the first embodiment, a path from the diode 104 to the load section 111 via the FET 107 is located. Therefore, when the power source 101 alone is connected, power is supplied to the load section 111 by using a path via the FET 107. As a result, power efficiency increases as compared to a case in which power is supplied to the load section 111 by using a path via the voltage conversion section 105.

When the power source 102 is connected in the state shown in FIG. 4, that is, when changing Pattern 3 to Pattern 1 shown in FIG. 6, switching of power source occurs. That is, the power source that supplies power to the load section 111 changes from the power source 101 to the power source 102. Since a negotiation sequence occurs between the power source 102 and the power receiving apparatus 103, power supply from the power source 102 to the power receiving apparatus 103 stops for a predetermined period after the power source 102 is connected.

Figure 8:
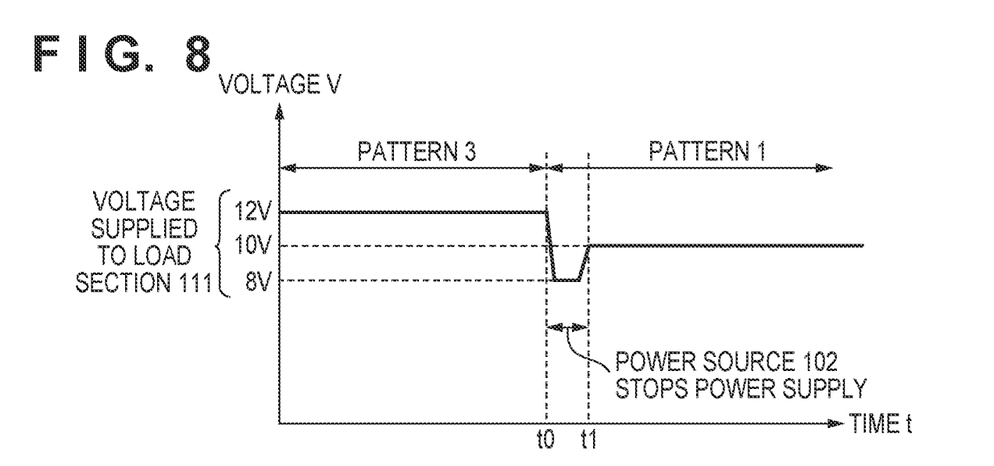
FIG. 8 is a view exemplarily showing a voltage supplied to the load section when switching power supply by the power source 101 to power supply by the power source 102.

FIG. 8 is a view exemplarily showing voltage supplied to the load section 111 when switching power supply by the power source 101 to power supply by the power source 102. As with FIG. 7, a horizontal axis indicates time t, and a vertical axis indicates voltage V. A case in which switching of power source has occurred at t=t0 is shown.

That is, it is shown that switching from a state in which power is supplied from the power source 101 to a state in which power is supplied from the power source 102 has occurred at t=t0. Hence, in accordance with FIG. 2, the FET 107 changes from the "ON" state to the "OFF" state at t=t0.

Before switching of power source occurs (i.e., when t<t0), the state of connection is Pattern 3 shown in FIG. 6. Hence, as described above, the load section 111 is supplied with power from the power source 101, and its voltage value is 12 V.

After switching of power source has occurred (i.e., when t>t0), the state of connection is Pattern 1 shown in FIG. 6. In a predetermined period immediately after the switching (t0<t<t1), a negotiation sequence occurs between the power source 102 and the power receiving apparatus 103. Hence, the power source 102 is stopping power supply to the power receiving apparatus 103. As will be described later, a power of 8 V is supplied from the diode 106 side in this state.

Figure 9:
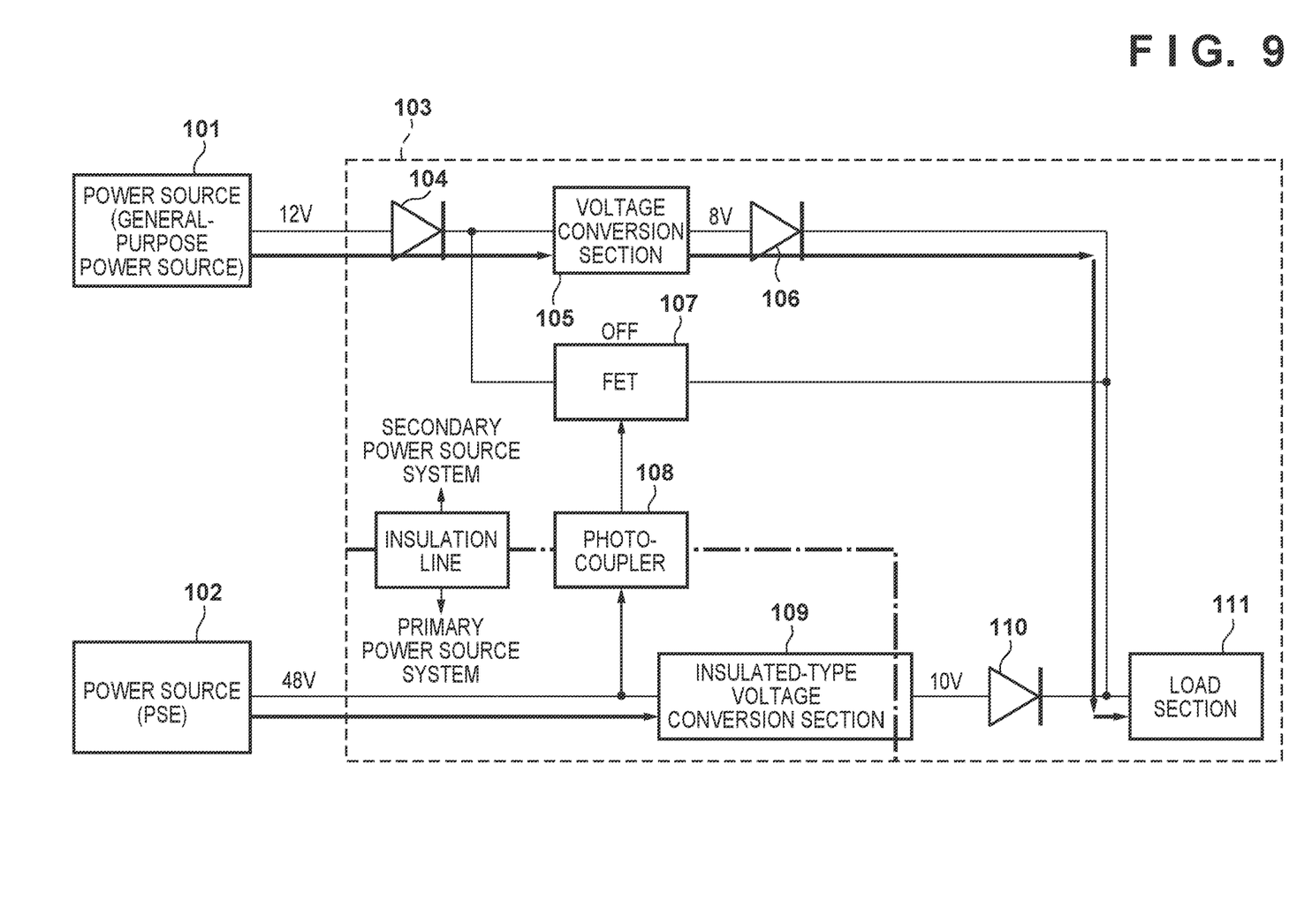
FIG. 9 is a view exemplarily showing the state of power supply to the load section in the period of $t0<t<t1$ shown in FIG. 8.

FIG. 9 is a view exemplarily showing a state of power supply to the load section 111 in the period of t0<t<t1 shown in FIG. 8. The insulated-type voltage conversion section 109 is stopping power supply, but the power source 102 is connected. Hence, the FET 107 is in the "OFF" state. The load section 111 is supplied with power from the diode 106 side.

Note that when a path via the voltage conversion section 105 and the diode 106 does not exist, it is impossible to supply power to the load section 111 in the period of t0<t<t1 shown in FIG. 8. Hence, power supply to the load section 111 stops.

In the period of t>t1, since the power source 102 has started power supply to the power receiving apparatus 103, the state of power supply is as shown in FIG. 3. Its voltage value is 10 V as described above.

In this way, even when changing Pattern 3 to Pattern 1, switching of power source is possible without stopping power supply to the load section 111.

<4. Operation When Changing Pattern 2 to Pattern 1>

Figure 5:
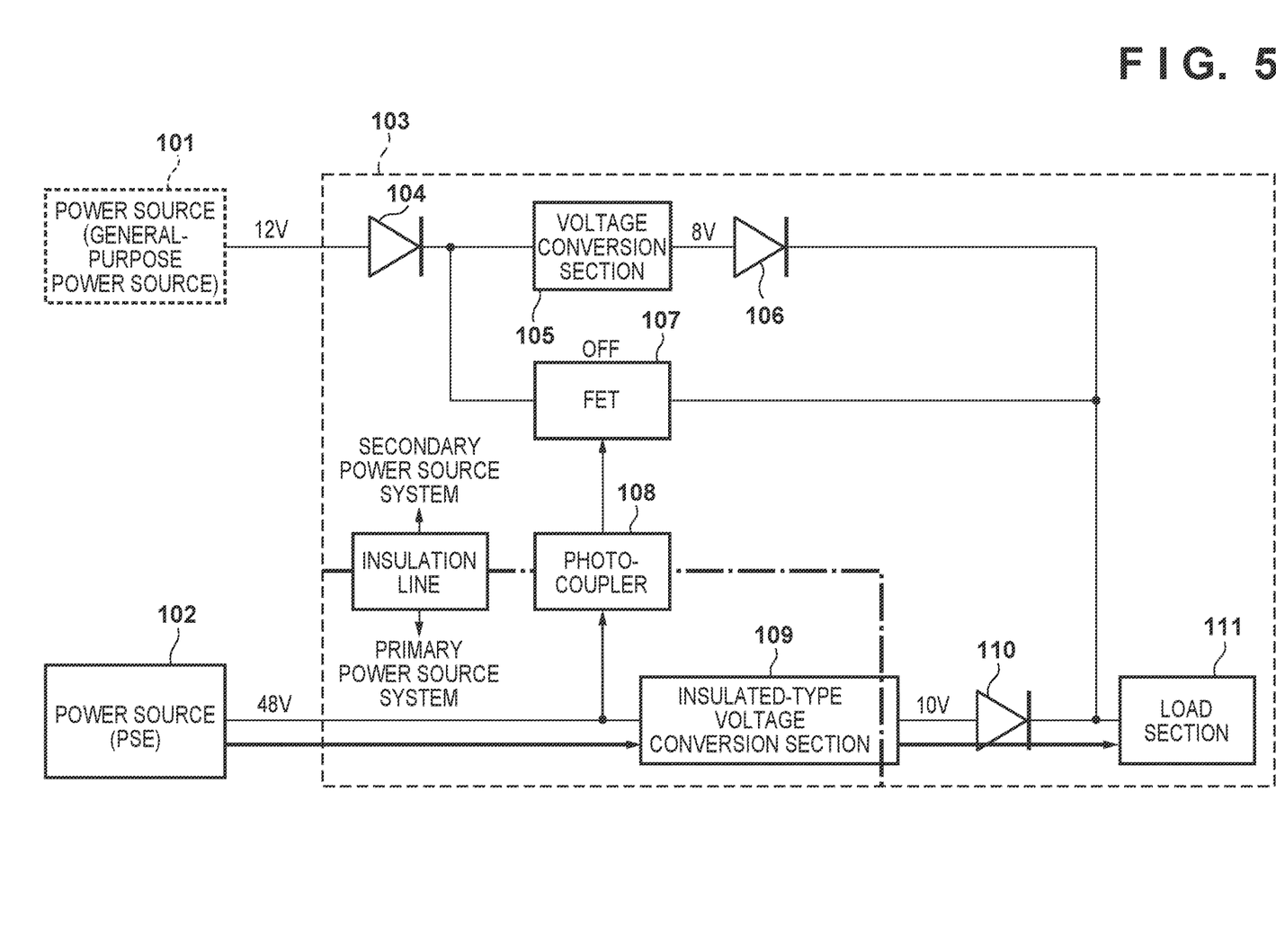
FIG. 5 is a view exemplarily showing the state of power supply when a power source 102 alone is connected.

FIG. 5 is a view exemplarily showing the state of power supply when a power source 102 alone is connected. That is, FIG. 5 shows a voltage supply state in Pattern 2 shown in FIG. 6.

Since the power source 101 is not connected, a voltage of 48 V supplied from the power source 102 is converted to 10 V by the insulated-type voltage conversion section 109, and supplied to the load section 111 via the diode 110.

When the power source 101 is connected in the state shown in FIG. 5, that is, when changing Pattern 2 to Pattern 1 shown in FIG. 6, switching of power source does not occur. That is, the power source to supply power to the load 111 remains to be the power source 102. Hence, stop of power supply to the load section 111 does not originally occur.

As described above, according to the first embodiment, the power receiving apparatus 103 supplies, to the load section, power of a second converted voltage obtained by converting the second voltage from the power source 101 for a predetermined period after power reception from the power source 102 has started. More specifically, a first path via the FET 107, which is turned off when the power source 102 is connected, and a second path via the voltage conversion section 105 are located to supply power for a predetermined period after power reception from the power source 102 has started. With this arrangement, in the power supply apparatus that switches a power supply source for use, stable power supply to a load section becomes possible while improving power efficiency in power reception.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-220127, filed Nov. 15, 2017, which is hereby incorporated by reference herein in its entirety.

What is claimed is:

1. A power supply apparatus that is configured to be capable of receiving power from a first power source and a second power source, and provide power to a load section, the apparatus comprising:
   circuitry comprising:
      a first supply path configured to supply power of a first converted voltage obtained by converting a first voltage from the first power source;
      a second supply path configured to supply power of a second voltage from the second power source; and
      a third supply path configured to supply power of a second converted voltage obtained by converting the second voltage from the second power source,
   wherein the apparatus is configured such that power is supplied to the load section by one of the first supply path, the second supply path, and the third supply path, based on a power receiving state of power from the first power source and the second power source, and
   wherein, the apparatus is configured such that when the power is supplied to the load section by the second power source, the power is supplied from the third supply path for a predetermined period after the first power source is connected, and then the power is supplied from the first supply path to the load section.

2. The apparatus according to claim 1, wherein the apparatus is configured such that (i) the power is supplied to the load section by the first supply path when power is received from the first power source, and (ii) the power is supplied to the load section by the second supply path when power is received from the second power source alone.

3. The apparatus according to claim 1, wherein the first supply path includes a first voltage conversion section configured to convert the first voltage to the first converted voltage, and a first diode located between the first voltage conversion section and the load section,
   wherein the third supply path includes a second voltage conversion section configured to convert the second voltage to the second converted voltage, a second diode located between the second power source and the second voltage conversion section, and a third diode located between the second voltage conversion section and the load section,
   wherein the second supply path includes a switch located between the second diode and the load section, and a detection unit configured to detect a power receiving state of power from the first power source to the first voltage conversion section, and
   wherein the switch is configured to be turned off when the detection unit detects power reception and to be turned on when the detection unit does not detect power reception.

4. The apparatus according to claim 3, wherein an output from the first diode and an output from the second diode are configured to be combined by diode-OR connection when the switch is ON,
   wherein the output from the first diode and an output from the third diode are configured to be combined by diode-OR connection when the switch is OFF, and
   wherein the first converted voltage is higher than the second converted voltage and lower than the second voltage.

5. The apparatus according to claim 3, wherein the detection section is a photocoupler, and
   wherein the first voltage conversion section is an insulated-type voltage conversion section.

6. The apparatus according to claim 1, wherein the first voltage is higher than the second voltage.

7. The apparatus according to claim 1, wherein the first power source comprises a power supply apparatus which operates in accordance with a PoE (Power Over Ethernet) standard.

8. The apparatus according to claim 7, wherein the apparatus is configured such that a negotiation based on the PoE standard is executed between the first power source and the power supply apparatus in the predetermined period.

9. The apparatus according to claim 1, wherein the load section comprises a camera.

* * * * *